US011721842B2

(12) United States Patent
Lemke et al.

(10) Patent No.: US 11,721,842 B2
(45) Date of Patent: Aug. 8, 2023

(54) DEVICE FOR ELECTROPOLISHING AN ENERGY STORAGE DEVICE COMPRISING AT LEAST ONE LITHIUM ION CELL, CHARGER, AND METHOD FOR OPERATING THE CHARGER

(71) Applicants: VOLKSWAGEN AKTIENGESELLSCHAFT, Wolfsburg (DE); AUDI AG, Ingolstadt (DE); Dr. Ing. h.c. F. Porsche Aktiengesellschaft, Stuttgart (DE)

(72) Inventors: Andreas Lemke, Ummendorf (DE); Mirko Herrmann, Mountain View, CA (US)

(73) Assignees: VOLKSWAGEN AKTIENGESELLSCHAFT, Wolfsburg (DE); AUDI AKTIENGESELLSCHAFT, Ingolstadt (DE); Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 476 days.

(21) Appl. No.: 16/642,508

(22) PCT Filed: Aug. 30, 2018

(86) PCT No.: PCT/EP2018/073396
§ 371 (c)(1),
(2) Date: Feb. 27, 2020

(87) PCT Pub. No.: WO2019/043120
PCT Pub. Date: Mar. 7, 2019

(65) Prior Publication Data
US 2020/0220225 A1    Jul. 9, 2020

(30) Foreign Application Priority Data

Aug. 31, 2017    (DE) ..................... 10 2017 215 295.8

(51) Int. Cl.
*H02J 7/00*        (2006.01)
*H01M 10/42*    (2006.01)
(Continued)

(52) U.S. Cl.
CPC ... *H01M 10/4207* (2013.01); *H01M 10/4264* (2013.01); *H01M 10/44* (2013.01);
(Continued)

(58) Field of Classification Search
CPC ..................................................... H02J 7/0069
(Continued)

(56) References Cited

U.S. PATENT DOCUMENTS 6,307,352 B1 * 10/2001 Hooper ................ H02J 7/00711
320/139
6,366,056 B1    4/2002 Podrazhansky et al.
(Continued)

FOREIGN PATENT DOCUMENTS

| CN | 101083346 A | 12/2007 |
| CN | 101331088 A | 12/2008 |

(Continued)

OTHER PUBLICATIONS

International Search Report of PCT Application No. PCT/EP2018/073396, dated Nov. 14, 2018.
(Continued)

*Primary Examiner* — Yalkew Fantu
(74) *Attorney, Agent, or Firm* — Pearl Cohen Zedek Latzer Baratz LLP

(57) ABSTRACT

A device for electropolishing an energy storage device having at least one lithium-ion cell comprises at least one actuatable first switch which is connected in series to a capacitor and an electrical resistor for current limitation parallel to at least one lithium ion cell, wherein an apparatus for discharging the capacitor is connected in parallel at least
(Continued)

to the capacitor (C). The invention further relates to a charger and to a method for operating the charger.

9 Claims, 3 Drawing Sheets

(51) Int. Cl.
    *H01M 10/44*     (2006.01)
    *H02J 7/34*     (2006.01)

(52) U.S. Cl.
    CPC .......... *H02J 7/0014* (2013.01); *H02J 7/0069* (2020.01); *H02J 7/345* (2013.01)

(58) Field of Classification Search
    USPC ....................................................... 320/129
    See application file for complete search history.

(56) References Cited

U.S. PATENT DOCUMENTS

| | | | | |
|---|---|---|---|---|
| 6,724,173 | B2* | 4/2004 | Cummings | H02J 7/0016 320/134 |
| 2001/0019257 | A1 | 9/2001 | Bynum | |
| 2008/0105551 | A1 | 5/2008 | Wang et al. | |
| 2012/0038318 | A1 | 2/2012 | Mueller et al. | |
| 2014/0327406 | A1 | 11/2014 | Hempel | |
| 2015/0295421 | A1* | 10/2015 | Blakemore | H02J 7/0068 320/128 |
| 2016/0064957 | A1* | 3/2016 | Card | H02J 7/0068 320/129 |
| 2018/0040922 | A1 | 2/2018 | Sung et al. | |

FOREIGN PATENT DOCUMENTS

| | | | |
|---|---|---|---|
| CN | 101834321 | A | 9/2010 |
| CN | 102282051 | A | 12/2011 |
| CN | 104040823 | A | 9/2014 |
| DE | 2929261 | * | 2/1981 |
| DE | 2929261 | A1 | 2/1981 |
| DE | 10 2011 087 496 | A1 | 6/2013 |
| DE | 10 2014 218 277 | | 3/2016 |
| EP | 0 047 183 | | 3/1982 |
| GB | 1 599 076 | | 9/1981 |
| JP | 2013110885 | A | 6/2013 |
| WO | WO 0076049 | A1 | 12/2000 |
| WO | WO 2017/014487 | A1 | 1/2017 |

OTHER PUBLICATIONS

Search Report for German Patent Application No. 10 2017 215 295.8, dated Mar. 21, 2018.
Asghar Aryanfar et al., "Dynamics of Lithium Dendrite Growth and Inhibition: Pulse Charging Experiments and Monte Carlo Calculations", *The Journal of Physical Chemistry Letters*, 2014, vol. 5, No. 10, pp. 1721-1726.
Owen Crowther et al., "Effect of Electrolyte Composition on Lithium Dendrite Growth", 2008, *Journal of the Electrochemical Society*, vol. 155, No. 11, pp. A806-811.
Office Action for Chinese Patent Application No. 201880070776.7, dated Mar. 1, 2023.

* cited by examiner

DEVICE FOR ELECTROPOLISHING AN ENERGY STORAGE DEVICE COMPRISING AT LEAST ONE LITHIUM ION CELL, CHARGER, AND METHOD FOR OPERATING THE CHARGER

CROSS-REFERENCE TO RELATED APPLICATIONS

This application is a National Phase Application of PCT International Application No. PCT/EP2018/073396, International Filing Date Aug. 30, 2018, claiming priority of German Patent Application No. 10 2017 215 295.8, filed Aug. 31, 2017, which is hereby incorporated by reference.

FIELD OF THE INVENTION

The invention relates to a device for electropolishing an energy store comprising at least one lithium-ion cell. The invention further relates to a charger and a method for operating such a charger.

BACKGROUND OF THE INVENTION

Devices and methods for charging electrical energy stores are known from the prior art. However, the increasing electrification of motor vehicles has intensified the requirements on the energy store as well as the charging process, with regard not only to safety but also durability and load capacity. Energy stores based on lithium-ion cells, which ensure a high performance potential, are often used in present motor vehicles having an electric drivetrain. Individual lithium-ion cells are connected to one another in series and/or in parallel in an electrical energy store or battery module. In normal operation, the electrical energy stored in the cells is used by consumers, in particular one or more electric machines, of the motor vehicle. Charging the energy stores during travel is possible in generator mode of the drive system; typically, rather low charging currents are achievable, resulting in a correspondingly longer charging time for the lithium-ion cells.

In addition, it is known to supply the energy stores with electrical energy using an external charger. This also allows quick charging to ensure further operation of the drive unit within a short time. To shorten the charging time, the charging current is increased, which, however, has adverse effects on the service life of the energy store. A high charging current results in deposits of lithium metal (Li plating) in the cell, initially with formation of lithium nucleation seeds, in which elemental lithium deposits as nanoscale particles, followed by formation of sponge-like or needle-shaped dendrites. In particular at low temperatures, a high charging current results in increased formation of needle-shaped dendrites. When these grow, they may penetrate the protective films and/or separating membranes of the cells and thus make the cell inoperable. Therefore, the ability to prevent the development of dendrites or to easily remove formed dendrites is of great interest.

To this end, it is proposed in unexamined German patent application DE 10 2011 087 496 A1, for example, to charge the cells in a pulsed manner, wherein the charge pulse exceeds a nominal charging current of the joint cell, and the cell is discharged between the charge pulses via load pulses, with the load pulses being shorter than the charge pulses. The pulsed discharging of the particular cell results in breakdown of the dendrites or crystals that have built up during the charging operation. Due to the pulsed discharging, a brief but intense discharging operation takes place, resulting in breakdown, preferably during discharging, of the lithium nucleation seeds, which on account of their nanoscale dimensions have enormous surfaces. The chemical process is quite similar to electropolishing, in which metallic surfaces are smoothed by high currents. This is therefore also referred to below as electropolishing of the cells. For this purpose, it is proposed that the charger is provided with a capacitor that is used for discharging during the load pulse, and an electrical resistor by means of which the capacitor is discharged. This circuit allows targeted discharging of the cells, and due to the breakdown of the sponge-like or needle-shaped dendrites the surface, in particular at the anode of the particular cell, is restored or polished.

A device is known from unexamined patent application WO 2017/014487 A1 that is designed to ensure a uniform electrical charge distribution on energy stores of a storage device. For this purpose, the device has an actuatable switch that is connected in series with a capacitor, and an electrical resistor that is connected in parallel to the energy stores. In addition, the device has a polarity reversal circuit that is connected in parallel to the capacitor.

SUMMARY OF THE INVENTION

The object of the invention is to provide an improved device and an improved method for electropolishing, which allow the electropolishing in a simple, cost-effective manner, increase the service life of the energy store, shorten the charging time, and permit charging with higher charging currents.

The object of the invention is achieved by a device having the features of Claim 1. The device is characterized in that it has at least one actuatable first switch that is connected in series with a capacitor, and an electrical resistor for current limitation connected in parallel to at least one lithium-ion cell or to the energy store, an apparatus for discharging the capacitor being connected in parallel at least to the capacitor. The invention thus provides that an electrical resistor for current limitation is associated with the capacitor, and that an additional apparatus for discharging the capacitor is connected in parallel to the capacitor. The device according to the invention thus combines an RC element, in which the resistor limits the current and the capacitor ensures that the resistor cannot be overloaded in the event of a defective switch. The requirements for robustness of the switch itself are thus reduced, and the device is implemented in a cost-effective manner. When the capacitor is discharged, the maximum current pulse is limited by the resistor. The cell thus undergoes the desired high discharge pulses, and the lithium nucleation seeds are broken down. After a certain period of time, the capacitor charges and the discharge current thereby drops. When the capacitor is fully charged, the resistance increases infinitely. The particular charge pulse or discharge pulse is switched on by actuating the switch. The switch in particular is a semiconductor switch that is quickly and precisely actuatable. As soon as the switch is opened, the capacitor is discharged by the apparatus connected in parallel. The capacitor is thus prepared for the next discharging operation or discharge pulse. This results in the advantage of a particularly reliable charging device and an advantageous charging operation for the particular lithium-ion cell.

According to one preferred refinement of the invention, it is provided that the apparatus has an actuatable second switch and a consumer for using the energy stored by the capacitor. The apparatus may be connected, and unintentional discharging of the capacitor is thus reliably prevented, by use of the second switch. The consumers use the energy that is released by the capacitor and, for example, convert it into heat.

It is preferably provided that the consumer is an electrical resistor that converts the energy stored by the capacitor into heat during the discharging of the capacitor. The capacitor may thus be easily discharged, which allows the capacitor to be available once again for the next electropolishing operation within a short period of time.

In addition, it is preferably provided that the apparatus has at least one freewheeling diode. The freewheeling diode ensures that the current flows in only one direction during discharging of the capacitor, thus reliably preventing undesirable discharging of the capacitor. In particular, it is thus possible to automatically connect the consumer.

It is preferably provided that the apparatus is connected in series and has the freewheeling diode and the electrical resistor, and the switch is dispensed with. This switch-free design of the apparatus provides an automatic discharging operation for the capacitor, which is quick and manages without separate means for controlling a second switch. The device may thus be implemented in a particularly robust and cost-effective manner.

According to one preferred refinement of the invention, it is provided that the apparatus has a controllable electrical energy converter, in particular a direct current converter. This electrical energy converter is provided in particular instead of the freewheeling diode, the consumer, and the second switch. The electrical energy converter discharges the capacitor as needed, and makes the released energy usable for further consumers and/or units of the electric drivetrain of the motor vehicle. In particular, it is possible by means of the energy converter to recover the energy, released by the capacitor, for the charging operation.

In particular it is provided that the energy converter is designed as a direct current converter. This results in the advantage that the recovered portion of energy may be supplied to the charging operation, and the portion of energy used for electropolishing may be at least partially recovered. This results in a particularly efficient method in which the discharge energy of the capacitor is not primarily converted into heat.

Furthermore, it is preferably provided that the energy converter is connected to at least one of the lithium-ion cells and/or to the energy store in order to feed the discharge energy of the capacitor back into the lithium-ion cell or the energy store. The energy that is released by the discharging of the capacitor is thus advantageously supplied directly back into the energy store.

In addition, according to the invention, the device is characterized in that it has a control unit that is configured in particular to control the at least one switch and preferably the energy converter in order to carry out a desired pulse discharge for electropolishing the lithium-ion cell and/or the energy store. This ensures simple control and implementation of the charging operation.

The charger according to the invention having the features of Claim 10 is characterized in that it has one device according to the invention in each case for at least one lithium-ion cell of the energy store or for the energy store as a whole, by means of which the advantageous discharging operation for electropolishing the particular lithium-ion cell may be carried out. When such a device is associated with each lithium-ion cell, the lithium-ion cells may be discharged separately in a particularly precise manner. When the device is associated with the energy store as a whole or with a group of lithium-ion cells (battery module), these lithium-ion cells are discharged and electropolished together by the device. Although this is less precise, it results in a simpler, more cost-effective variant of the charger. The charger preferably has the above-mentioned control unit which controls the one or more devices for electropolishing.

The method according to the invention having the features of Claim 11 is characterized in that during a charging operation of the energy stores by means of the charger, a pulse discharge of at least one lithium-ion cell of the energy store is carried out by means of at least one device associated with the energy store, as described above. This results in the advantages stated above.

BRIEF DESCRIPTION OF THE DRAWINGS

Further advantages and preferred features and feature combinations result in particular from the above discussion and from the claims. The invention is explained in greater detail below with reference to the drawings, which show the following:

DETAILED DESCRIPTION OF THE INVENTION

Figure 1:
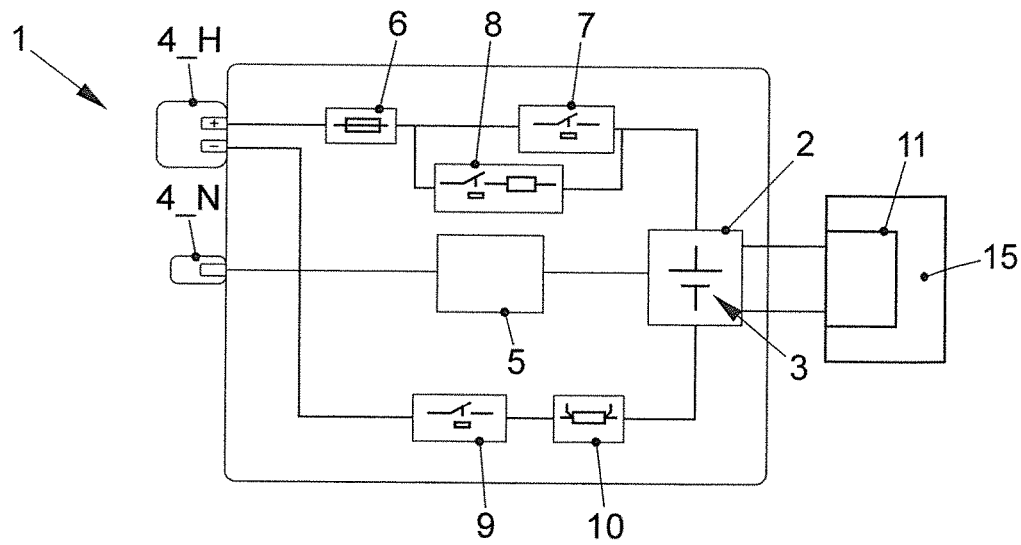
FIG. 1 shows an energy storage system of a motor vehicle.

FIG. 1 shows a simplified illustration of an energy storage system 1 of a motor vehicle, not illustrated in greater detail here. The energy storage system 1 has an energy store 2 that includes one or more lithium-ion cells 3 connected in series or in parallel to one another. In addition, the energy storage system 1 has a high-voltage terminal 4_H that is connectable, for example, to the electric drivetrain of the motor vehicle. Furthermore, the energy storage system 1 has a low-voltage terminal 4_N that is used, for example, for supplying energy to a control unit 5 of the energy storage system 1.

The energy store 2 is connected to the high-voltage terminal 4_H via a fuse 6 and a main contactor 7, a precharge circuit 8 being connected in parallel to the main contactor 7. The energy store 2 is connected to the negative pole of the high-voltage terminal 4_H via a further main contactor 9 and a current sensor 10. The control unit 5, which is also used as a battery management system, monitors the energy store 2 and optionally also the fuse 6 as well as the apparatuses 7, 8, 9, and 10.

The charging of the energy store 2 is regulated by a charging current that is specified by the battery management system. To shorten the charging time, the charging current is increased, which may result in lithium nucleation seeds and nanoscale particles forming sponge-like or needle-shaped dendrites.

A device 11 that is integratable into the energy storage system 1 or provided by a charger is presented below in different exemplary embodiments, and is used as needed to remove the in particular needle-shaped dendrites from the lithium-ion cells 3 of the energy store 2. The presented device 11 is thus used for electropolishing in particular an anode of the particular lithium-ion cell 3.

Figure 2:
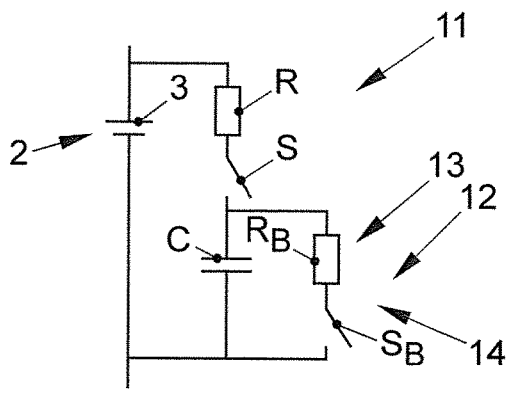
FIG. 2 shows an advantageous device for electropolishing lithium-ion cells of the energy store.

FIG. 2 shows a first exemplary embodiment of the device 11 in a simplified illustration. A resistor R is connected in parallel, and a capacitor C is connected in series, to the energy store 2, with an actuatable switch S situated between the capacitor C and the resistor R. In addition, a balancing circuit 12 having a balancing resistor $R_B$ and a further switch $S_B$ is situated in parallel to the capacitor C.

The circuitry of the particular lithium-ion cell 3 is designed as a function of the properties of the cell, i.e., its capacitance and its electrode surface area or electrode size, which determines the capacitance and resistor values of the cell. Due to the RC element, which is made up of the resistor R and the capacitor C, wherein the resistor R limits the current flow and the capacitor C ensures that no overload occurs when a switch S is defective, the maximum current pulse is limited by the resistor R when a capacitor is discharged, so that the energy store 2 or the particular cell undergoes the desired high discharge pulse, and lithium nucleation seeds are thus broken down, wherein the capacitor C charges over a certain period of time and the discharge current is thus decreased. As soon as the capacitor C is fully charged, the resistance increases infinitely. By closing the switch $S_B$ and opening the switch S, the energy stored in the capacitor may then be converted into heat via the balancing resistor $R_B$ and thus released. The resistor $R_B$ thus represents a consumer 13 that uses energy that is buffered in the capacitor, thus preparing the capacitor C for the next discharge pulse.

Figure 3:
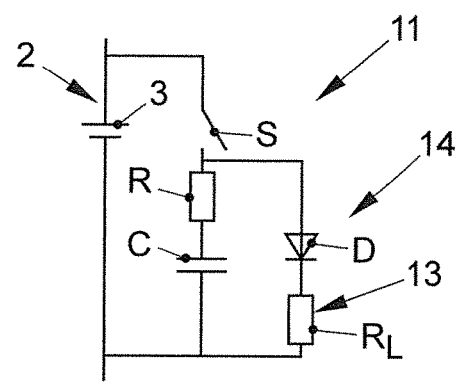
FIG. 3 shows a second exemplary embodiment of the advantageous device.

FIG. 3 shows a second exemplary embodiment of the device 11. The device 11 according to the second exemplary embodiment differs from the preceding exemplary embodiment in that a freewheeling diode D and the consumer 13 connected in series thereto are connected in parallel to the capacitor C and the resistor R. The consumer 13 in this case is likewise a resistor $R_L$. The switch S is connected upstream from the capacitor C, the resistor R, and the diode D and the consumer 13. The same as for the balancing resistor $R_B$ and the switch S, the diode D and the consumer 13 represent an apparatus 14 for discharging the capacitor C.

The device 11 having the apparatus 14 according to the second exemplary embodiment has the advantage over the first exemplary embodiment that after the switch S is opened, the energy of the capacitor C is automatically released or removed by the consumer 13.

In principle, the device 11 may be designed in two variants. In the limitation in FIG. 3, the need for active components is less; for this purpose, however, the cell balancing must be discharged via the capacitor C, whereas in the first exemplary embodiment the cell balancing may be carried out independently of the capacitor C.

The device 11 is preferably integrated into a charger 15 that represents an external charger and has its own voltage supply for charging the energy store 2. By use of the device 11, the pulse-like discharging operation of one or more lithium-ion cells of the energy store 2 may be carried out during the charging operation in particular to break down the needle-shaped dendrites.

Figure 4A:
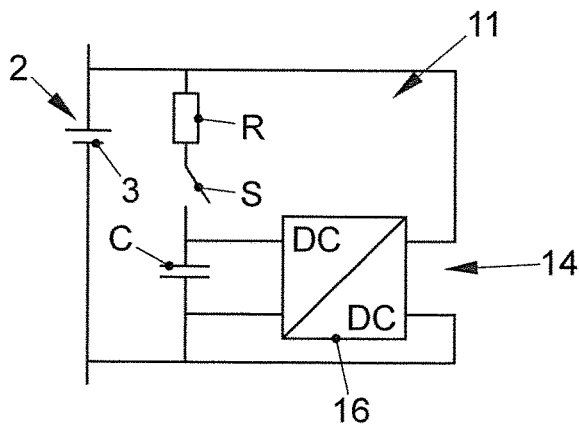
FIGS. 4A and 4B show a third exemplary embodiment of the advantageous device.
Figure 4B:
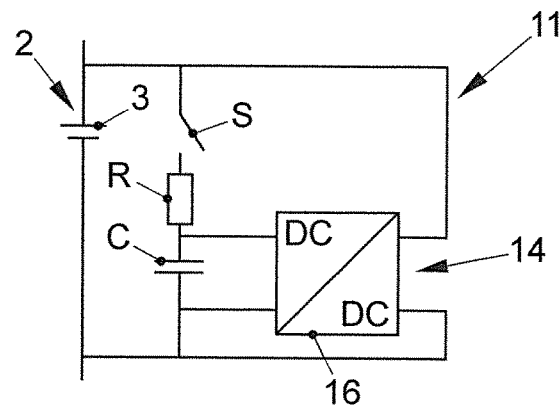

FIGS. 4A and 4B show further exemplary embodiments of the device 11, which differ from the preceding exemplary embodiments in that the apparatus 14 has a controllable energy converter 16, in the present case in the form of a direct voltage converter. The direct voltage converter 16 is integrated into the charger 15 or into the energy storage system 1 in such a way that the direct voltage converter is connected on the one hand in parallel to the capacitor C, and on the other hand is connected on the output side in particular to the energy store 2 and/or a lithium-ion cell of the energy store 2 in order to return the energy that is released by the capacitor C to the energy store 2 and thus assist with the charging operation. The energy converter 16 thus replaces the consumer 13 and the switch S or the diode D, and allows recovery of at least a major portion of the energy that is used for the electropolishing.

The exemplary embodiments from FIGS. 4A and 4B differ solely in that the arrangement of the resistor R and of the switch S are interchanged. The switches S2 and S1 and the resistors R each have the same dimensions.

Figure 5:
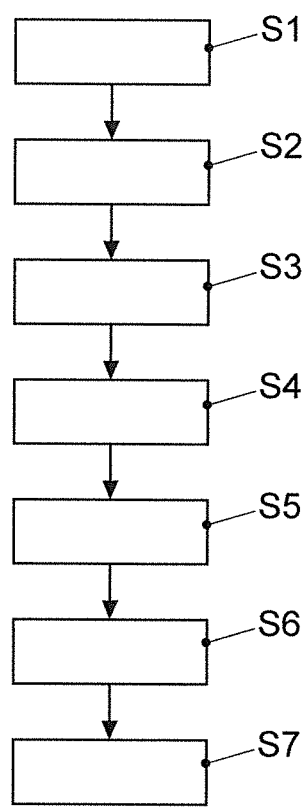
FIG. 5 shows a flow chart for explaining an advantageous method for operating the advantageous device.

FIG. 5 shows one advantageous method for operating the charger 15 or the device 11, with reference to a simple flow chart. The method is advantageously carried out by a regulator and in particular by the control unit 5. The following discussion refers to the exemplary embodiment of FIG. 2. The switch S is opened, thus deactivating the balancing circuit, in the first step S1.

The charging current i during the charging operation is monitored in a second step S2. When this charging current i=0, it is assumed that the previous charge pulse is ended. The pulse switch S is subsequently switched on in a step S3, thus connecting the capacitor C to the lithium-ion cell 3 in order to discharge it.

The resistance value Z formed by the capacitor C for the particular lithium-ion cell 3 is subsequently detected in a step S4 at multiple points in time $t_1$ through $t_x$, where $t_x$ represents the point in time at which the capacitor reaches its maximum resistance.

This point in time $t_x$ is compared to the point in time at which the charging current becomes equal to zero in a subsequent step S5. In particular a difference of $t_x$-t is formed (when i=0) and compared to the value $t_x$. If the difference is greater than or equal to the point in time $t_x$, the pulse switch S is once again deactivated or switched off, and the balancing switch $S_B$ is switched on.

A check is subsequently made in a step S6 as to whether the time of the charge pulse corresponds to 5 τ, where τ=$R_B$×C. If this is determined, the balancing switch $S_B$ is switched off.

The new charging current $i_{charge}$ (t) for the next charge pulse is subsequently determined in a step S7 as a function of the instantaneous resistance value, and the charging process is continued.

A discharge pulse is carried out in particular periodically.

Different variants using the advantageous device 11 or the charger 15 are conceivable. Thus far it has been assumed that in each case a device 11 for electropolishing is connected to each lithium-ion cell 3, so that dendrites possibly present may be removed from the individual cells by the pulse discharge. However, it is alternatively conceivable that the device 11 is simultaneously associated with multiple lithium-ion cells 3 in order to jointly discharge them. The multiple lithium-ion cells 3 may form, for example, a module of the energy store 2, wherein the energy store 2 preferably has multiple such modules, each with a device 11. It is also conceivable to associate the device 11 with the energy store 2 as a whole in order to carry out the discharging process or the electropolishing for all lithium-ion cells 3 of the energy store 2 at the same time.

Figure 6:
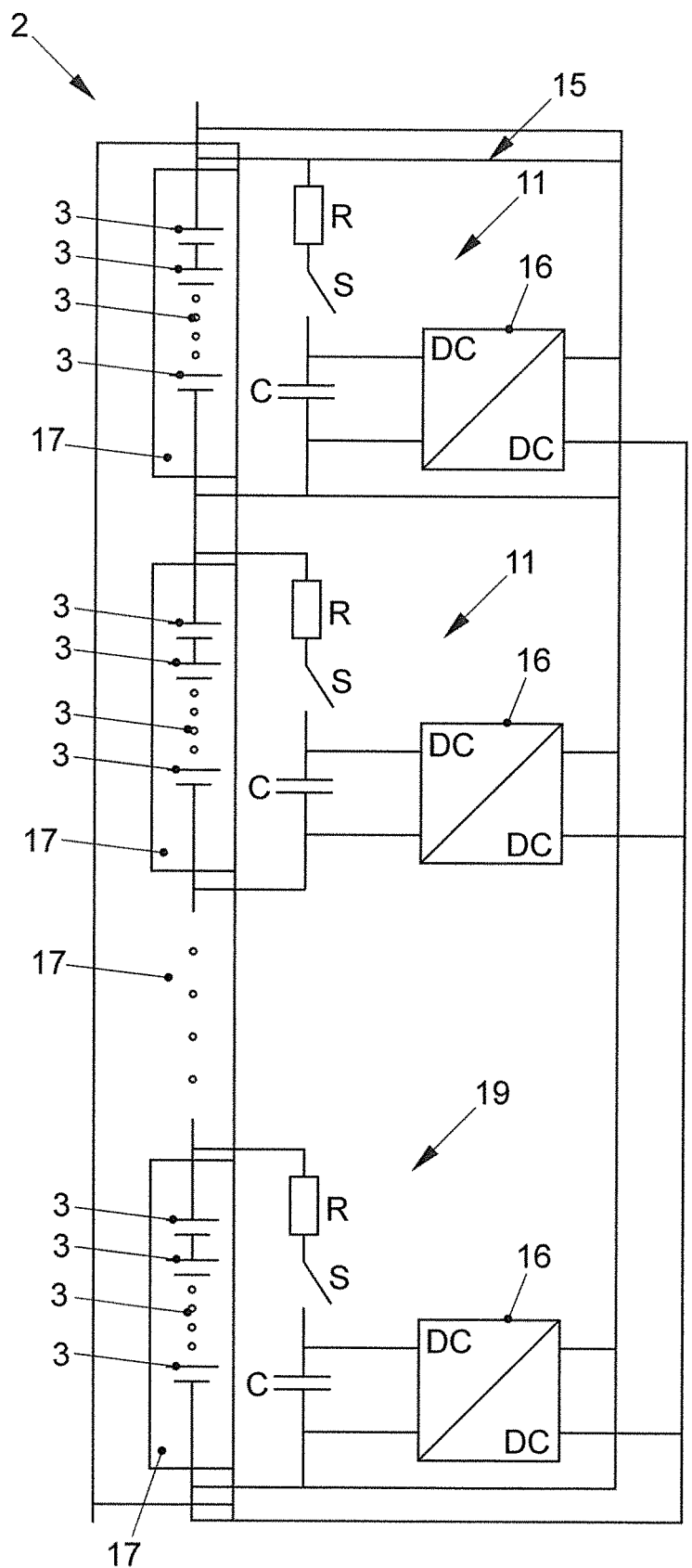
FIG. 6 shows an application example of the advantageous device from FIG. 4A.

FIG. 6 shows a variant in one exemplary embodiment in which a device 11 is associated in each case with a module made up of multiple lithium-ion cells $Z_1$ through $Z_n$, wherein in this case the device 11 is designed according to the exemplary embodiment from FIG. 4a. The current fed back from the energy converter 16 is supplied to the energy store 2, not to the particular module. Alternatively, the fed-back current could also be supplied to the particular module.

Overall, this results in particular in the following variants:

According to one exemplary embodiment, a device 11 according to FIG. 4A is associated with each single cell 3, wherein a secondary side of the energy converter 16 is connected to the positive and negative poles of the single cell, so that the energy is fed directly back to the single cell.

According to another exemplary embodiment, it is provided that the device 11 is associated in each case with one cell, wherein the secondary side of the energy converter 16 is connected to the positive and negative poles of the battery module, which includes multiple of the lithium-ion cells 3 connected in series, so that the energy is fed back to the battery module.

According to another exemplary embodiment, it is provided that the device 11 is associated in each case with one cell 3, wherein the secondary side of the energy converter 16 is connected to the positive pole and the negative pole of the energy store 2 as a whole, wherein the energy store includes a series connection of multiple single cells 3. The energy that can be fed back to each single cell during the electropolishing is thus returned to the overall battery system.

Alternatively, the energy store 2 has multiple battery modules, each with multiple single cells that in particular are connected to one another in series, wherein the energy, as described above, is then fed back to the energy store or to the particular battery module.

According to another exemplary embodiment, it is provided that a device 11 is associated with each battery module, wherein the secondary side of the particular energy converter 16 is connected to the positive pole and the negative pole of the particular battery module, so that the fed-back energy is supplied to the particular battery module.

According to another exemplary embodiment, it is provided that a device 11 is associated with each battery module, wherein the secondary side of the particular energy converter 16 is connected to the positive pole and the negative pole of the energy store 2, so that the energy of the battery modules released during the electropolishing is fed back as a whole into the energy store 2.

According to another exemplary embodiment, it is provided that the device 11 is associated with the entire battery system or the entire energy store 2, wherein the secondary side of the one energy converter 16 is then associated with the positive pole and the negative pole of the energy store 2, so that the energy for electropolishing all cells 3 of the energy store 2 is returned to the battery system or the energy store 2.

FIG. 6 shows the exemplary embodiment in which multiple single cells 3 are combined to form a battery module 17 in each case, wherein multiple of these battery modules 17 are connected in series in the energy store 2. A device 11 that is in particular part of the charger 15 and functions as described above is associated with each battery module 17. In the present case, the devices 11 are designed according to the exemplary embodiment from FIG. 4A. The secondary side of the particular energy converter 16 is connected in each case to the positive pole and the negative pole of the energy store 2, so that the energy released during the electropolishing in the discharging of the capacitor C is fed back as a whole to the energy store 2.

Due to the advantageous design of the devices 11 and the advantageous method, the service life and reliability of the energy store 2 are increased by periodically breaking down the lithium nucleation seeds. In addition, charging of the energy store 2 with an increased charging current and a shortened charging time is made possible. The longer usability of the energy store 2 also results in cost advantages. Energy losses that result in particular when the energy converter 16 is used in the device 11 are minimized during the electropolishing.

The time of the overall discharge pulses advantageously corresponds to 0 to 50%, preferably 0.01% to 25%, particularly preferably 0.05% to 10%, and in particular 0.1% to 5%, of the charging time. The number of discharge pulses is preferably 1 to 5, in particular 2 to 20, particularly preferably 5 to 100, preferably 10 to 1000. The discharge pulse duration is preferably 0.001 s to 30 s, in particular 0.005 s to 10 s, particularly preferably 0.01 s to 5 s, and in particular 0.02 s to 2 s.

LIST OF REFERENCE SYMBOLS 1 energy storage system
2 energy store
3 lithium-ion cell
4_H high-voltage terminal
4_N low-voltage terminal
5 control unit
6 fuse
7 main contactor/apparatus
8 apparatus
9 apparatus
10 apparatus
11 device
12 balancing circuit
13 consumer
14 apparatus
15 charger
16 energy converter
17 battery module
R resistor
$R_B$ resistor
$R_L$ resistor
C capacitor
D freewheeling diode
S switch
$S_B$ switch

The invention claimed is:

1. A device for electropolishing an energy storage unit having at least one lithium-ion cell, the device comprising:
   at least one actuatable first switch that is connected in series with a capacitor and an electrical resistor for current limitation,
   wherein the at least one actuatable first switch, the capacitor and the electrical resistor are connected in parallel to the at least one lithium-ion cell,
   an apparatus for discharging the capacitor connected in parallel at least to the capacitor, wherein the apparatus has a controllable electrical energy converter that is designed as a direct current converter, and
   a control unit that is configured to control the at least one actuatable first switch in order to carry out a pulse discharge for electropolishing the lithium-ion cell in such a way that at least one of lithium nucleation seeds, dendrites, and crystals are broken down by the pulse discharge.

2. The device according to claim 1, wherein the apparatus has an actuatable second switch and a consumer for using the energy stored by the capacitor.

3. The device according to claim 2, wherein the consumer has an electrical resistor for converting the energy stored by the capacitor into heat.

4. The device according to claim 1, wherein the apparatus has at least one freewheeling diode.

5. The device according to claim 4, wherein the apparatus has only the freewheeling diode and the electrical resistor connected in series.

6. The device according to claim 1, wherein the energy converter with its secondary side is connected to at least one lithium-ion cell in order to feed discharge energy of the capacitor back into the lithium-ion cell.

7. The device according to claim 1, wherein the control unit is configured in to control at least one of the at least one actuatable first switch and an electrical energy converter in order to carry out the pulse discharge for electropolishing.

8. A charger for electrically charging an energy store having multiple lithium-ion cells, comprising a device according to claim 1 for at least one of the lithium-ion cells.

9. A method for operating the charger according to claim 8, comprising, during the charging operation of an energy storage unit by means of the charger, carrying out a pulse discharge of at least one lithium-ion cell of the energy store by at least one device that is associated with the energy storage unit, in such a way that at least one of lithium nucleation seeds, dendrites, and crystals are broken down by the pulse discharge.

\* \* \* \* \*